(12) United States Patent
Mitnick et al.

(10) Patent No.: US 7,996,765 B1
(45) Date of Patent: Aug. 9, 2011

(54) SYSTEM AND METHOD FOR STYLE SHEET LANGUAGE CODING THAT MAINTAINS A DESIRED RELATIONSHIP BETWEEN DISPLAY ELEMENTS

(75) Inventors: Victor Mitnick, San Carlos, CA (US); James W. Doubek, Sunnyvale, CA (US); Alain M. Dumesny, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 978 days.

(21) Appl. No.: 11/852,063

(22) Filed: Sep. 7, 2007

(51) Int. Cl.
*G06F 17/00* (2006.01)

(52) U.S. Cl. ........ 715/235; 715/204; 715/234; 715/255; 715/273

(58) Field of Classification Search .......... 715/200–205, 715/209, 226, 227, 234–239, 243, 244–257, 715/273, 274, 700, 713, 731, 732, 746, 760, 715/762, 763, 764, 799, 808, 809, 825
See application file for complete search history.

(56) References Cited

U.S. PATENT DOCUMENTS

| | | | | |
|---|---|---|---|---|
| 6,668,354 | B1 * | 12/2003 | Chen et al. | 715/255 |
| 7,143,344 | B2 * | 11/2006 | Parker et al. | 715/236 |
| 7,249,318 | B1 * | 7/2007 | Corell et al. | 715/209 |
| 7,287,219 | B1 * | 10/2007 | Young et al. | 715/234 |
| 7,383,498 | B1 * | 6/2008 | Hickl et al. | 715/235 |
| 7,398,472 | B2 * | 7/2008 | Corrington et al. | 715/762 |
| 7,458,016 | B1 * | 11/2008 | Desai et al. | 715/234 |
| 7,620,891 | B2 * | 11/2009 | Aubert et al. | 715/236 |
| 2005/0144155 | A1 * | 6/2005 | Van Vlimmeren | 707/2 |
| 2005/0160359 | A1 * | 7/2005 | Falk et al. | 715/513 |
| 2006/0161841 | A1 * | 7/2006 | Horiuchi et al. | 715/513 |
| 2006/0174187 | A1 * | 8/2006 | White et al. | 715/501.1 |
| 2006/0206808 | A1 * | 9/2006 | Jasthi et al. | 715/522 |

FOREIGN PATENT DOCUMENTS

GB 2346238 A * 8/2000

OTHER PUBLICATIONS

Stephanie Sullivan, "Understanding the New Dreamweaver CS3 CSS Layouts", http://www.adobe.com/devnet/dreamweaver/articles/css_starter_pages.html, dated Dec. 7, 2007, pp. 1-7.
"Adobe Creative Suite 3 Web Premium What's New 8", © 2006 Adobe Systems Incorporated. All rights reserved in the USA. Dec. 28, 2006, pp. 1-12.

* cited by examiner

*Primary Examiner* — Maikhanh Nguyen
(74) *Attorney, Agent, or Firm* — Kilpatrick Townsend & Stockton LLP

(57) ABSTRACT

Systems and methods are provided for style sheet language coding that maintains a desired relationship between display elements. An authoring tool receives a desired attribute for a first display element, and the authoring tool generates style sheet language code for defining attributes of at least one other display element to maintain a predefined relationship between the display elements. Accordingly, as a developer defines (e.g., creates, modifies, etc.) attributes for one of the display elements, the authoring tool autonomously updates the style sheet language code to define the attributes of the other display elements to maintain the predefined relationship therebetween. In certain embodiments, the authoring tool provides an interface that enables a developer to directly define certain attributes of a display element, wherein the authoring tool generates style sheet language code to indirectly define the attributes in a manner that reflects the developer's direct definition thereof.

18 Claims, 11 Drawing Sheets

SYSTEM AND METHOD FOR STYLE SHEET LANGUAGE CODING THAT MAINTAINS A DESIRED RELATIONSHIP BETWEEN DISPLAY ELEMENTS

TECHNICAL FIELD

The following description relates generally to computer coding, and more specifically to systems and methods for style sheet language coding that maintains a desired relationship between display elements.

BACKGROUND OF THE INVENTION

Hypertext markup language (HTML) is a markup language typically used to define the style, appearance, and/or structure of a document displayed in a web browser. HTML and its successor languages, such as Extensible HTML (XHTML) have been generally used to define the style, appearance, and/or structure of web pages from the very early stages of the well-known World Wide Web (the "web") portion of the Internet. Traditionally, markup tags defining the structure, such as those defining headings, paragraphs, lists, tables, and the like (i.e., structural markup), were included in an HTML document alongside markup tags defining the style and appearance of the page content, such as bold, underlined, font, font size, and the like (i.e., stylistic markup). To enhance the appearance of web pages, developers included increasing amounts of stylistic markup in such markup language documents. However, with all of such stylistic markup, the markup language coding (e.g., HTML) for even the most basic web page often became undesirably long and complicated, which resulted in increased difficulty in creating and editing the markup language documents defining the web pages. More recently, style sheet languages, such as Cascading Style Sheets (CSS), have been developed to aid in defining the styling for a given document, such as a web page.

Now, the World Wide Web (WWW) contains web pages that use both markup language documents (e.g., HTML documents) and style sheet language documents (e.g., CSS). Over the past several years, HTML has become the predominant markup language for the creation of web pages. It describes the structure and content (e.g., text, forms, embedded images, and/or other objects) of a web page. Meanwhile, CSS is a popular style sheet language used to describe the presentation (e.g., colors, fonts, layout, etc.) of documents written in markup language. By using a markup language (e.g., HTML) and style sheet language (e.g., CSS) together, web designers are able to advantageously separate a web page's structure and content (written in markup language) from its presentation formatting (written in style sheet language). For instance, using CSS, developers are generally able to define the style of an entire web document by defining styles in a CSS document, and applying those styles to the content and structure defined by a markup language document. Because the style is applied to the content, one style may be applied to multiple sections of the markup language document, thus reducing the size of the coding for defining the resulting web page. Moreover, developers may change the entire appearance of a web page by changing the CSS without effecting the content of the page.

Generally speaking, web pages are viewed using web browsers. Web browsers interpret HTML and CSS elements of a web page, and render the web page to a user. There are many web browsers available today, including, as examples, Microsoft Corp.'s INTERNET EXPLORER®, Mozilla Corp.'s FIREFOX®, Opera Software ASA's OPERA®, Netscape Communications Corp.'s NETSCAPE®, and Apple Computer Corp.'s SAFARI®, among others. When creating or modifying web pages, designers frequently use an authoring tool (as may be included in an application development environment) such as, for example, Adobe Systems Inc.'s DREAMWEAVER® and/or GOLIVE® for coding the markup language document defining the structure/content and for coding a style sheet language document defining the presentation format of the web page.

Though CSS is quickly becoming a best-practices standard for controlling the style of web documents, it is typically used only by experienced web developers because of its complexity. CSS can be hard to understand, and adjusting certain style attributes, such as the width of a sidebar column, may break everything else in the layout due to inter-related properties. Part of the difficulty in working with CSS is a result of the way in which display elements are defined in CSS. Attributes for each of various display elements are defined independently in CSS. That is, while a relationship may be desired between display elements, CSS does not support a definition of any such relationship but instead requires that a developer define the attributes of each display element independent of any other display element. For example, a developer may define multiple columns (display elements) to be included in a presentation format for a web page. However, such attributes as the position, width, height, etc. are defined independently for each column. Thus, if the attributes are changed for one of the columns, it may destroy a desired relationship between the two columns unless attributes of the other column are also modified. For example, the two columns may be positioned side-by-side, wherein a change widening the width of the first column may cause the first column to overlap with the second column, unless the position and/or width of the second column is independently changed. Because CSS does not support simple expressions, there is no easy way for developers to manage the inter-relationships desired for display elements.

Further difficulty arises as a result of how attributes of display elements are defined in CSS. In general, many attributes of display elements are defined in an indirect manner. For instance, the locations of a left edge and right edge of a column are generally each defined with reference to the edge of its container. For instance, the left edge of the column may be defined as being located a certain number of pixels (or % or ems) from the left edge of its container, wherein the container may be an entire page or some other block-level element, as examples. In many instances, certain attributes of the column may be defined indirectly in the CSS code. As an example, suppose a 3 column layout is defined, with a left sidebar of fixed width, a right sidebar of fixed width, and a main content column in the center, which fills up the remaining available space. This may be achieved by not specifying a width on the main (center) column, but rather specifying its left and right margins, which essentially tell where the left and right edges of the center column should be relative to the left and right edges of its container. Such indirect definitions of certain attributes of display elements in the CSS code further adds to the difficulty in defining attributes of display elements and maintaining a desired relationship between the display elements.

BRIEF SUMMARY OF THE INVENTION

In view of the above, a desire exists for a system and method that improves the efficiency and ease of developing style sheet language documents (e.g., CSS documents). For example, a desire exists for systems and methods that aid a developer in defining attributes desired for display elements and/or aiding the developer in maintaining a desired relationship between various display elements defined for a document (e.g., a web page).

Embodiments of the present invention are directed generally to systems and methods for style sheet language coding that maintains a desired relationship between display elements. As described further herein, certain embodiments of the present invention provide an authoring tool that receives a desired attribute for a first display element, and the authoring tool is operable to generate style sheet language code for defining attributes of at least one other display element to maintain a predefined relationship between the display elements. For example, a desired relationship between display elements may be defined (e.g., in metadata associated with the CSS document), and an attribute for one of the display elements may be defined (e.g., created, modified, etc.). For instance, a developer may input information defining (e.g., creating, modifying, etc.) an attribute of one of the display elements. In response to such defining of an attribute of one of the display elements, the authoring tool determines the attributes to be defined (e.g., created, modified, etc.) for the other display elements in order to maintain the desired relationship. That is, the authoring tool determines the attributes to be defined for the other display elements in order to maintain the desired relationship in view of the defined attribute of the one display element. The authoring tool may generate style sheet language code to so define the determined attributes for the other display elements in order to maintain the desired relationship. Accordingly, as a developer defines attributes for one of the display elements, the authoring tool autonomously updates the style sheet language code to define the attributes of the other display elements so as to maintain the predefined relationship between the display elements.

As an example, according to one embodiment, two columns may be defined within the style sheet language document, wherein the developer desires for the columns to have a side-by-side relationship in which the columns are immediately adjacent each other. The desired relationship between the columns may be defined in metadata (or other data associated with the style sheet language document) that is readable by the authoring tool. As described further herein, in certain embodiments, the authoring tool may provide certain templates that include various display elements predefined therein (e.g., for popular presentation formats commonly used for web pages). Such templates may have associated therewith metadata that defines the relationship between the display elements. In certain embodiments, a developer may define a relationship between display elements that is desired for a given style sheet language document, wherein such defined relationship may be maintained in metadata (or other data associated with the style sheet language document) that is readable by the authoring tool.

Continuing with the above example, in response to a developer defining an attribute of one of the two columns, the authoring tool may autonomously generate style sheet language code to define attributes of the other column so as to maintain the desired relationship between the columns. For instance, in response to the developer editing the attributes of the first column to increase its width, the authoring tool may autonomously edit the attributes of the second column to maintain the desired side-by-side relationship (rather than having the first column overlap the second column). For example, the authoring tool may modify attributes of the second column to shift the position of the second column and/or to narrow the width of the second column in order to maintain the desired side-by-side relationship between the columns once the width of the first column is increased.

As mentioned above, in many instances, certain attributes of a display element (e.g., column) may be defined indirectly in the CSS code. In certain embodiments of the present invention, an authoring tool aids a developer in defining attributes desired for a display element. In certain embodiments, the authoring tool provides an interface that enables a developer to directly define certain attributes of a display element, wherein the authoring tool generates style sheet language code to indirectly define the attributes in a manner that reflects the developer's direct definition of the attributes. For example, an interface may be provided to enable a user (e.g., developer) to directly define such attributes as width, height, position of a column display element, and/or space between column display elements, as examples, wherein the authoring tool generates the corresponding style sheet language code to indirectly define such attributes of the column(s) to reflect the directly defined attributes. For instance, in response to the user directly defining a desired spacing between two columns (wherein the spacing is indirectly defined in the style sheet language code), the authoring tool may generate style sheet language code that specifies the desired location of the edges of the columns (e.g., relative to the edge of the container of the columns, such as by defining the margins) to result in the columns having the spacing defined by the user.

As another example, in certain embodiments, the authoring tool may provide not only a code view but also a display view, wherein a user may directly define desired attributes of a display element by interacting with the display element in the display view. For instance, a column display element may be shown in the display view, wherein a user may interact directly with such display element in the display view to, for example, change the width of such column. For example, the user may click and drag an edge of the column to result in the column having the desired width. In response to such direct definition of the desired attribute by the user, the authoring tool may generate style sheet language code to indirectly define such attributes of the column to reflect the directly defined attribute (e.g., to specify the desired location of the left edge and right edge of the column that results in the column having the width defined by the user in the display view).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
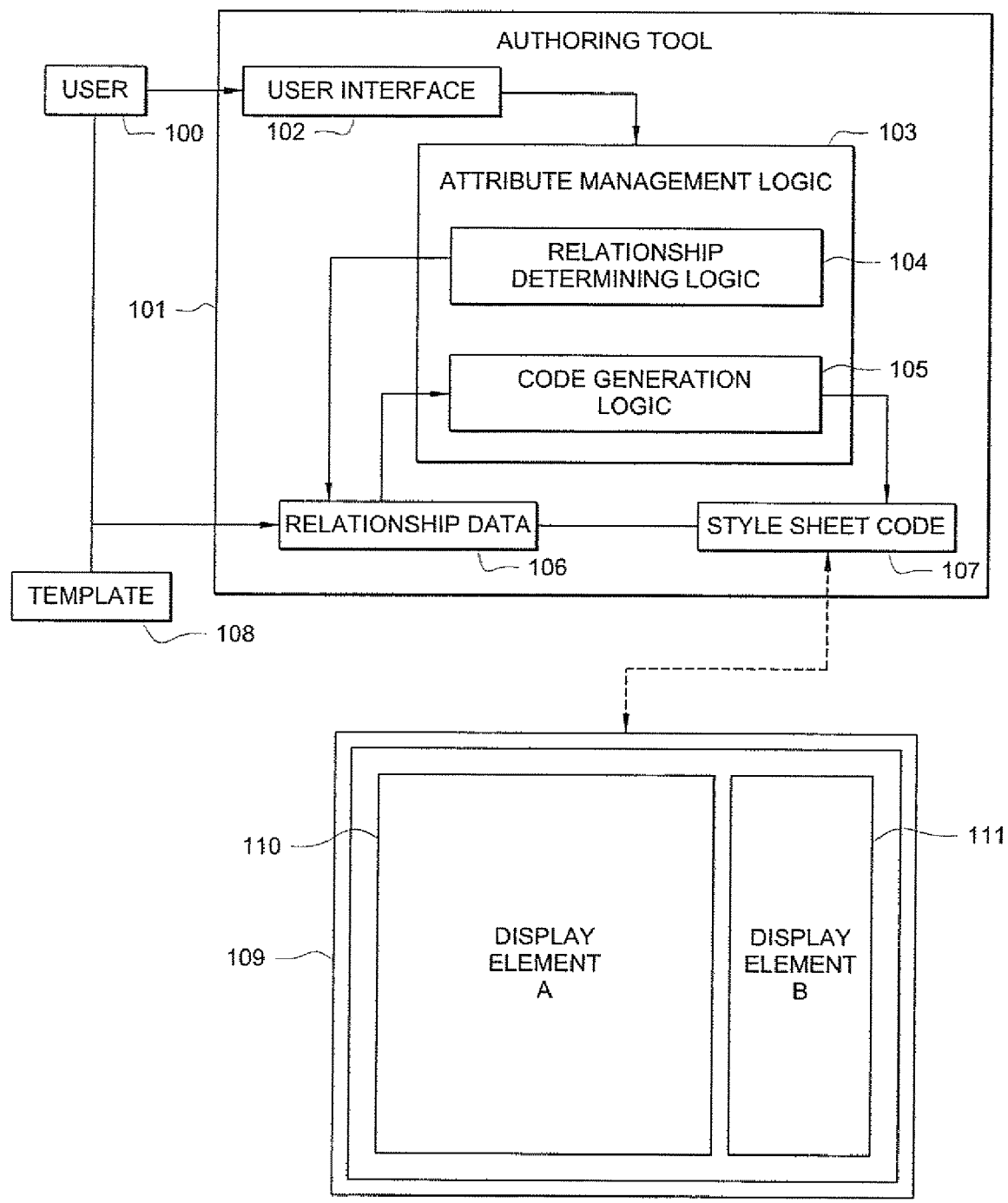
FIG. 1 shows a block diagram of a system according to one embodiment of the present invention.

FIG. 1 shows a block diagram of a system 10 according to one embodiment of the present invention. System 10 comprises an authoring tool 101, which may be implemented as part of an application development environment, such as DREAMWEAVER® available from Adobe Systems Incorporated or FRONTPAGE® available from Microsoft Corporation, as examples. Such a development environment may include not only authoring tool 101, but also such other code development tools as a debugger and a graphical user interface (GUI) builder, etc. Authoring tool 101 may thus comprise computer-executable software code stored to a computer-readable medium, wherein such code is executed by a computer to perform the authoring tool's functions described herein. Authoring tool 101 provides an interface 102 with which a user (e.g., developer) 100 can interact to author a document. For instance, user 100 may interact with authoring tool 101 to author a markup language (e.g., HTML) document to define content for a web page. Similarly, user 100 may interact with authoring tool 101 to author a style sheet language (e.g., CSS) document to define presentation format for the web page.

In certain embodiments, user interface 102 of authoring tool 101 may provide both a text-based code view and a graphical-based design view (or "display view") with which the user 100 may interact to author a document. The code view renders the source code as text in a portion of the screen and allows the developer to see and manipulate the source code in the document file. For example, the developer may write and edit HTML or CSS code in the code view. The design view, on the other hand, is a What You See Is What You Get (WYSIWYG) view of the document that allows the user to visually manipulate the interpreted and graphically laid-out version of the document, such as, for example, by dragging, dropping, cutting, and pasting visual components. As the developer works, changes to the document are reflected in both the code view and the design view. DREAMWEAVER is a known development environment that provides both a code editor view and a display editor view.

In the example illustrated in FIG. 1, user 100 is interacting with authoring tool 101 via such interface 102 to author style sheet code 107. In this exemplary embodiment, authoring tool 101 includes display element attribute management logic 103 that aids in managing attributes of display elements defined in the style sheet code 107 to maintain a predefined relationship between such display elements. For instance, style sheet code 107 may define two display elements 110 and 111, which are shown in display view 109. Display elements 110 and 111 may comprise any type of display elements that define a presentation format for content, wherein examples of such types of display elements include columns, rows, table cells, and any independent rectangular region defined in the document (e.g., as may be defined with div tags, paragraph tags, or as may be images, etc.). A desired relationship between the display elements 110 and 111 may be predefined in relationship data (e.g., metadata) 106 that is associated with style sheet code 107. Relationship data 106 comprises data stored to a computer-readable medium, which is readable by authoring tool 101. As described further herein, display element attribute management logic 103 is operable to determine, from the relationship data 106, the desired relationship between the display elements 110 and 111, and can aid in managing attributes of the display elements defined in the style sheet code 107 to maintain the desired relationship between such display elements. As described further below, in certain embodiments, attribute management logic 103 includes relationship determining logic 104 for accessing relationship data 106 that is associated with style sheet code 107, and determining from such relationship data 106 a desired relationship between display elements defined in the style sheet code 107. Further, in certain embodiments, attribute management logic 103 includes code generation logic 105 for generating style sheet language code within style sheet code 107 to maintain the determined relationship that is desired to be maintained between the display elements.

According to certain embodiments of the present invention, authoring tool 101 receives, via user interface 102, a desired attribute for a first display element (e.g., display element 110), and authoring tool 101 is operable to generate (by code generation logic 105) style sheet language code within style sheet code 107 for defining attributes of at least one other display element (e.g., display element 111) to maintain a predefined relationship (e.g., as defined by relationship data 106) between the display elements. Examples of attributes of the display elements that may be defined include position of a display element, width of a display element, height of a display element, size of a display element, and margin and/or padding attributes (each of which may have separate or shared values for top, right, bottom, and left). As described further herein, at least some of such attributes may be defined indirectly in the style sheet code 107, and in certain embodiments, user interface 102 may enable a user 100 to define the attributes directly, wherein authoring tool 101 may generate corresponding style sheet code for indirectly defining the attributes to achieve the direct definition received via user interface 102.

As an example, a desired relationship between display elements 110 and 111 may be defined in metadata or other relationship data 106 associated with the style sheet code 107, and an attribute one of the display elements may be defined (e.g., created, modified, etc.) via user interface 102. For instance, a user 100 may input information to authoring tool 101 via user interface 102 that defines (e.g., creates, modifies, etc.) an attribute of display element 110. In response to such defining of an attribute of display element 110, authoring tool 101 determines (e.g., by relationship determining logic 104) the attributes to be defined (e.g., created, modified, etc.) for display element 111 in order to maintain the desired relationship between display elements 110 and 111. That is, authoring tool 101 determines the attributes to be defined for display element 110 in order to maintain the desired relationship between display elements 110 and 111 in view of the defined attribute for display element 110. Authoring tool 101 may generate (e.g., by code generation logic 105) style sheet language code to so define the determined attributes for display element 111 in order to maintain the desired relationship between display elements 110 and 111. Accordingly, as a user 100 defines attributes for one of the display elements 110 and 111, authoring tool 101 autonomously updates the style sheet language code 107 to define the attributes of the other display elements so as to maintain the predefined relationship between the display elements (as defined by relationship data 106).

As an example, according to one embodiment, display elements 110 and 111 may be two columns that are defined within the style sheet language code 107, wherein the user 107 desires for the columns to have a side-by-side relationship in which the columns are immediately adjacent each other. The desired relationship between the columns may be defined in relationship data 106 (e.g., metadata or other data associated with the style sheet language code 107) that is readable by the authoring tool 101. In certain embodiments, authoring tool 101 may provide certain templates 108 that include various display elements, such as display elements 110 and 111, predefined therein (e.g., for popular presentation formats commonly used for web pages). Such templates 108 may have associated therewith metadata that defines the relationship between the display elements 110 and 111. In certain embodiments, a user 100 may define a relationship between display elements 110 and 111 that is desired for a given style sheet language document 107, wherein such defined relationship may be maintained in relationship data 106 that is readable by authoring tool 101.

Continuing with the above example, in response to user 100 defining (via user interface 102) an attribute of column 110, authoring tool 101 may autonomously generate (e.g., code generation logic 105) style sheet language code within style sheet language code 107 to define attributes of the other column 111 so as to maintain the desired relationship between the columns. For instance, in response to user 100 editing the attributes of the first column 110 to increase its width, authoring tool 101 may autonomously edit the attributes of the second column 111 to maintain the desired side-by-side relationship (rather than having the first column overlap the second column). For example, authoring tool 101 may modify attributes of the second column 111 to shift the position of the second column 111 and/or to narrow the width of the second column 111 in order to maintain the desired side-by-side relationship (as defined by relationship data 106) between the columns 110 and 111 once the width of the first column 110 is increased.

Figure 2:
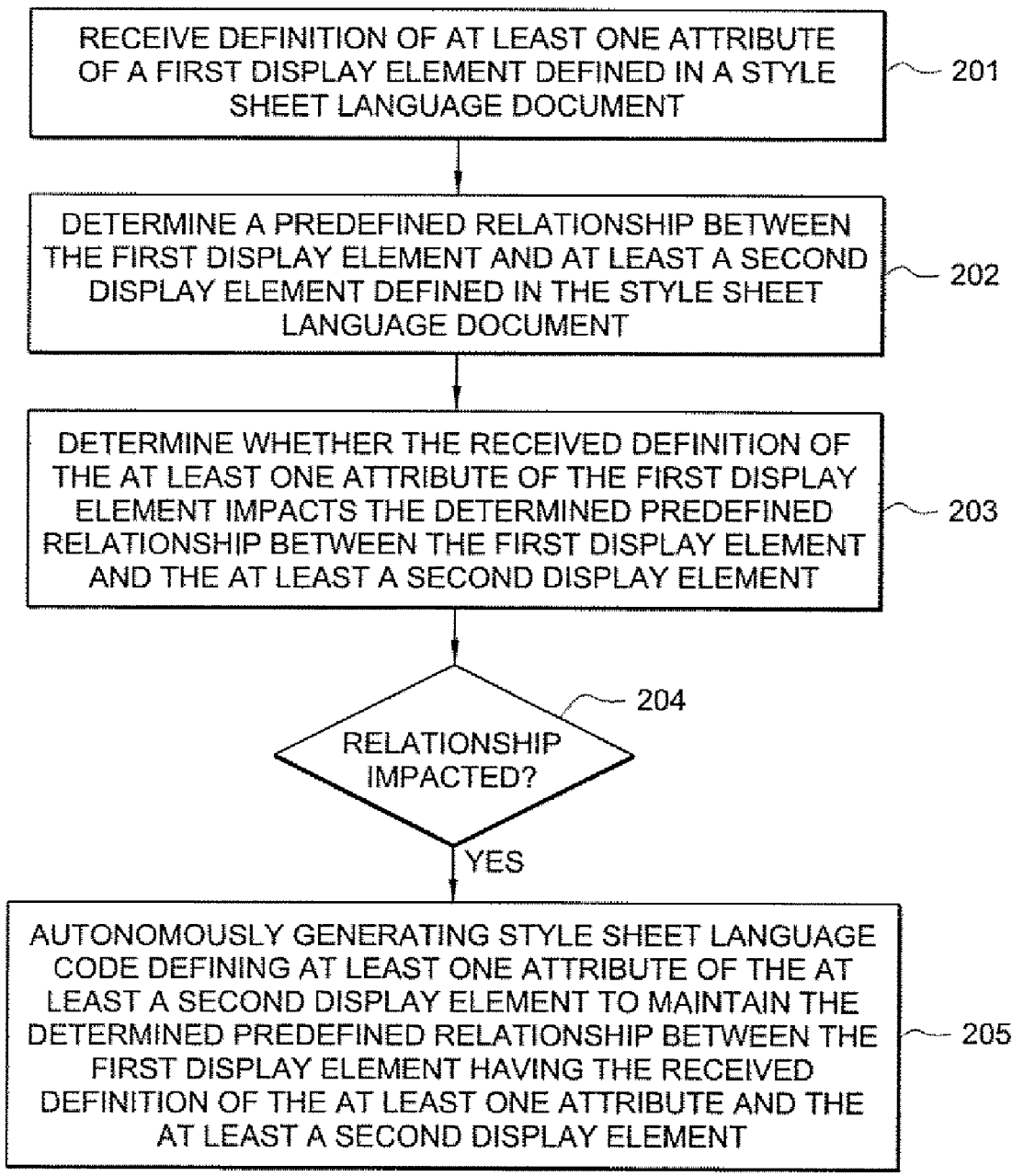
FIG. 2 shows an exemplary operational flow diagram for an authoring tool according to one embodiment of the present invention.

FIG. 2 shows an operational flow diagram of authoring tool 101 according to one embodiment of the present invention. In operational block 201, authoring tool 101 receives, via user interface 102, definition of at least one attribute of a first display element 110 defined in a style sheet language document 107. As described further herein, in certain embodiments, such definition of at least one attribute may be received via interaction with a display view 109, interaction with a code view, and/or interaction with some other interface tool provided by user interface 102. In operational block 202, authoring tool 101 determines (via relationship determining logic 104) a predefined relationship between the first display element 110 and at least a second display element 111 defined in the style sheet language document 107. As described further herein, such relationship may be predefined in relationship data 106 associated with style sheet language document 107, which is readable by authoring tool 101.

In operational block 203, authoring tool 101 determines whether the received definition of the at least one attribute of the first display element 110 impacts the determined predefined relationship between the first display element 110 and the at least a second display element 111. For instance, as mentioned above, first display element 110 and second display element 111 may be columns, and relationship data 106 may specify that the columns are to be arranged side-by-side immediately adjacent each other. A received definition for certain attributes of first column 110 may impact the defined side-by-side relationship with second column 111. For instance, a received definition for the width of the first column 110 may impact the side-by-side relationship with second column 111 (e.g., an increase in the width of the first column 110 may cause such column 110 to overlap with second column 111 if attributes of second column 111 are not modified).

When determined, in operational block 204, that the received definition of the at least one attribute of the first display element 110 impacts the determined predefined relationship between the first display element 110 and the at least a second display element 111, authoring tool 101 autonomously generates (via code generation logic 105), in operational block 205, style sheet language code defining at least one attribute of the at least a second display element 111 to maintain the determined predefined relationship between the first display element 110 having the received definition of the at least one attribute and the at least a second display element 111. Thus, continuing with the above example, when determined that the received definition for the width of the first column 110 impacts the predefined side-by-side relationship with second column 111, authoring tool 101 autonomously generates code within style sheet language code 107 defining at least one attribute of the second column 111 to maintain the side-by-side relationship (rather than having column 110 overlap column 111).

Figure 3A:
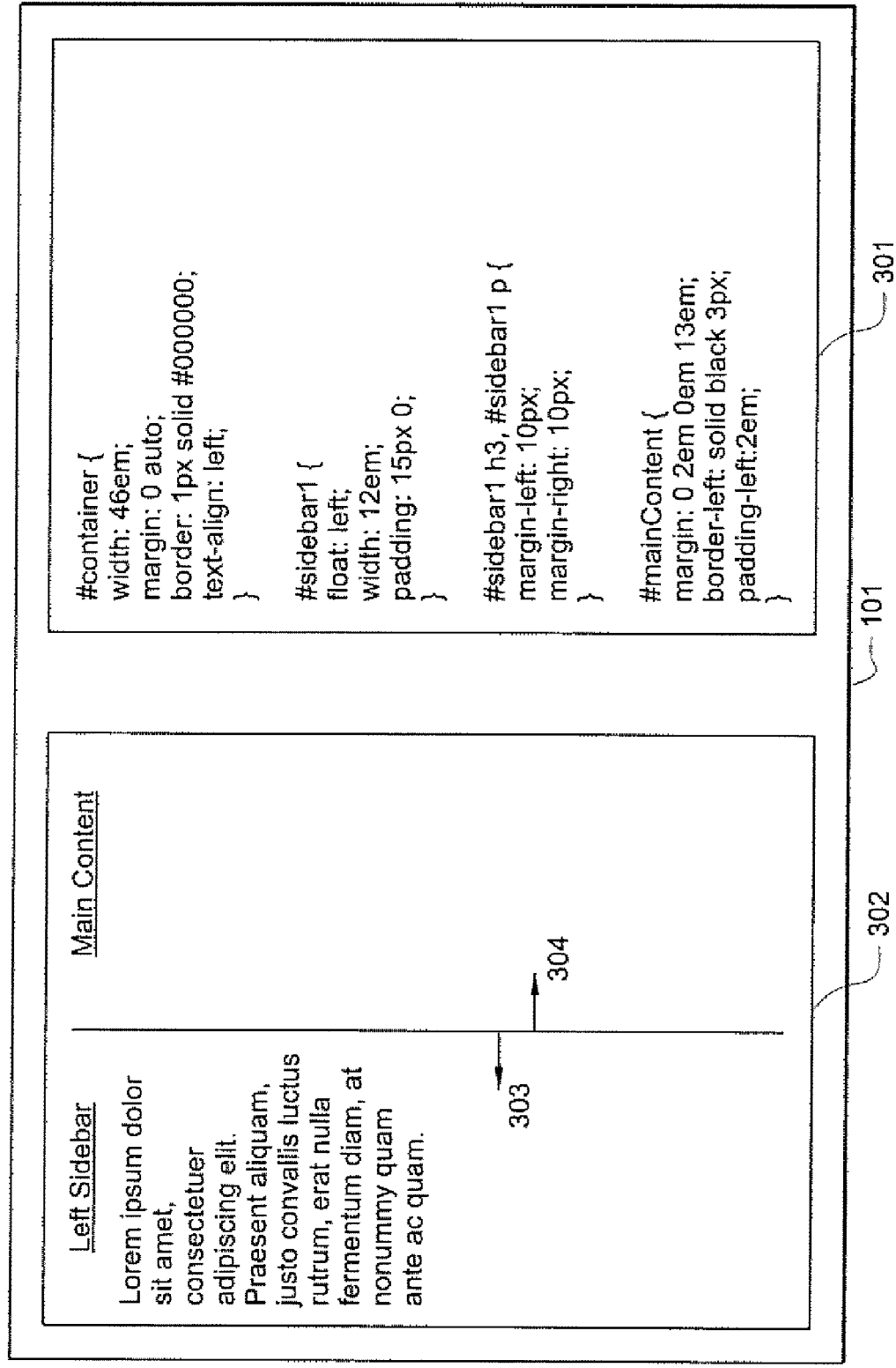
FIGS. 3A, 3B, and 3C illustrate an exemplary scenario in which an authoring tool of one embodiment of the present invention aids in maintaining a predefined relationship between display elements responsive to definition (e.g., modification) of an attribute of one of the display elements.
Figure 3B:
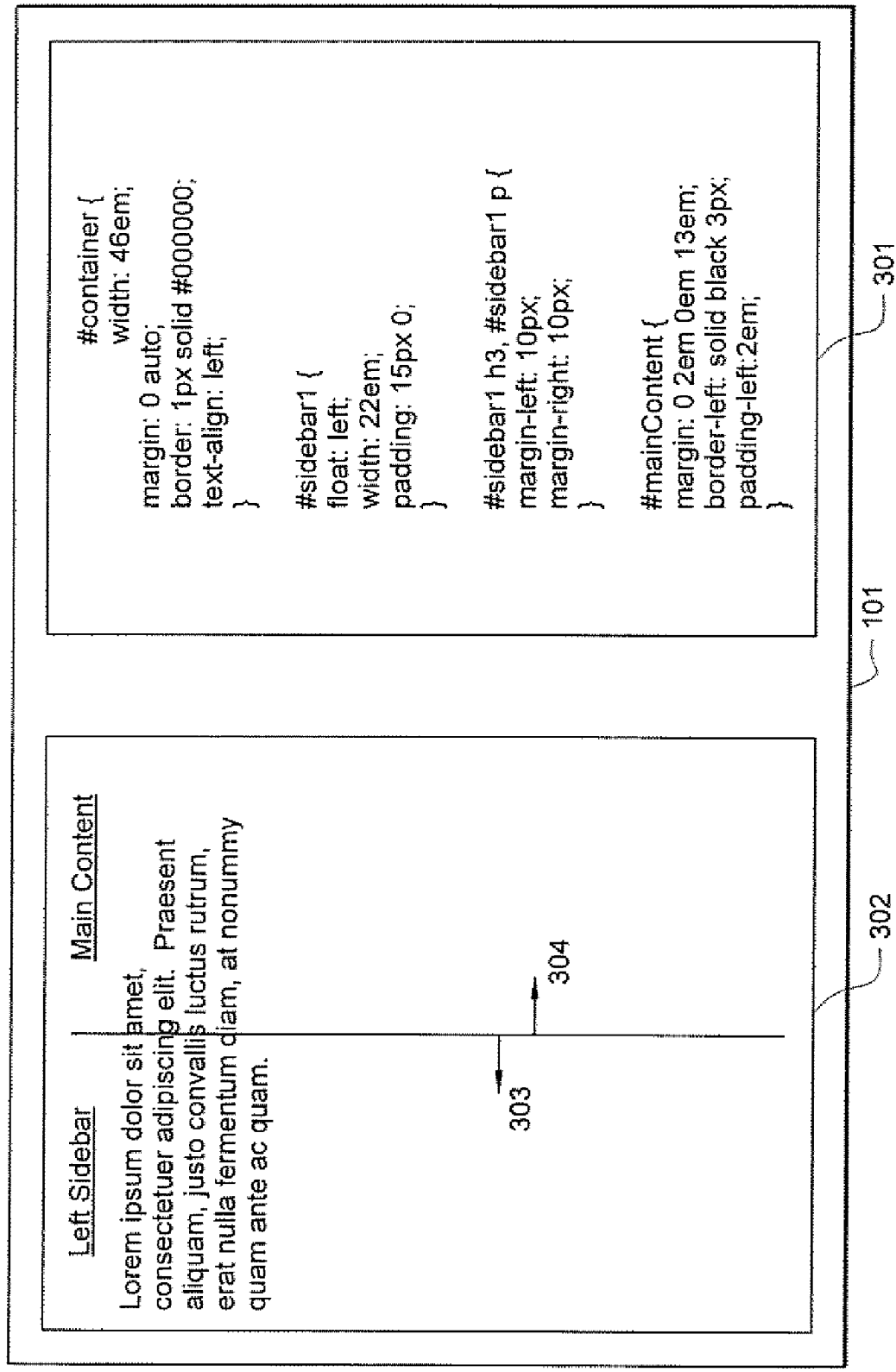
Figure 3C:
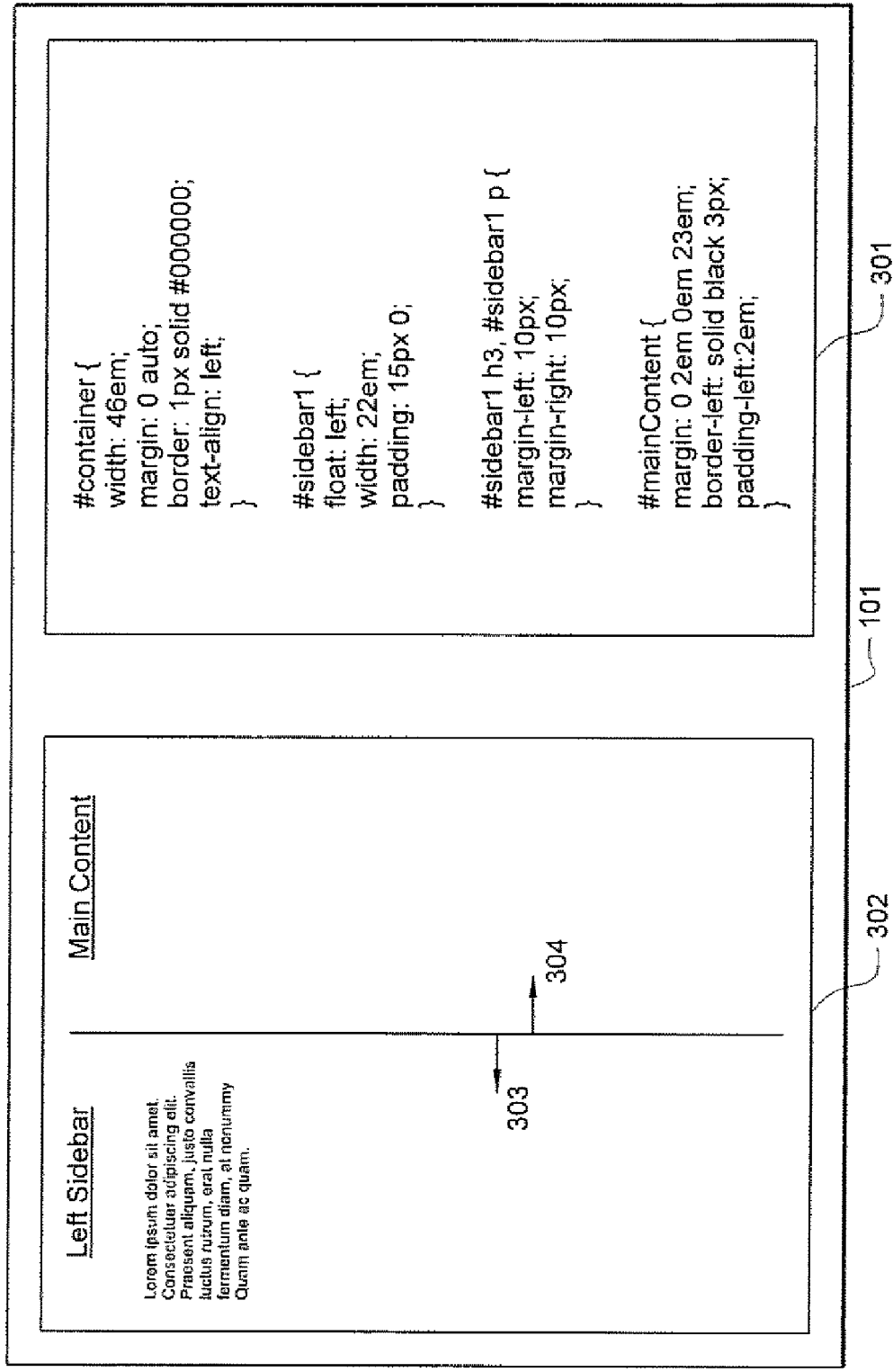

FIGS. 3A, 3B, and 3C illustrate an exemplary scenario in which an authoring tool 101 according to one embodiment of the present invention aids in maintaining a predefined relationship between display elements responsive to definition (e.g., modification) of an attribute of one of the display elements. In each of FIGS. 3A-3C, both a code view 301 and a display view 302 are presented to the user. In each case, the code view 301 shows exemplary CSS code, while display view 302 shows a corresponding presentation format that includes various display elements arranged as defined in the CSS code. While both code view 301 and display view 302 are shown for illustrative purposes in the example of FIGS. 3A-3C, it should be understood that in certain embodiments both views need not be provided by authoring tool 101. FIG. 3A shows an example in which CSS code (included in code view 301) defines two columns, shown in display view 302 as first column 303 and second column 304. In this example, the CSS code defines a regular two-column "elastic" layout, where the column widths are specified in "ems" so they are relative to the font size. The first column 303 is defined as a left sidebar display element with a width of 12 em.

FIG. 3B shows an example in which the CSS code from FIG. 3A has been modified to widen the first column 303. In particular, the first column 303 has been made wider such that it overlaps the second column 304. More specifically, in this example, the width of the left sidebar display element (first column 303) is changed from 12 em to 22 em. There is no "left edge of second column" property in the CSS code, and so it is not immediately obvious to a user how to modify the attributes of the second column 304 to maintain a desired relationship between the first column 303 and second column 304 (such that the first column 303 does not overlap with the second column 304). Traditionally, a developer is required to search through the style sheet code and manually change properties of the second column 304 in order to maintain a desired relationship between first column 303 and second column 304 (e.g., such that they do not overlap). This illustrates a relatively simple example of the traditional problem faced by developers when modifying attributes of defined display elements of a CSS document. As will be appreciated by those of ordinary skill in the art, this problem becomes increasingly difficult for resolution by developers as the number of display elements defined in a presentation format and their interdependencies increase. Further, for a developer who is not familiar with the particular CSS code defining the presentation format (e.g., the CSS code may be template code and/or may be code otherwise previously developed by another developer), correcting the code to separate the overlapping columns could be overly complicated.

Embodiments of the present invention aid a developer in maintaining a desired relationship between display elements defined in a CSS document. Accordingly, in one embodiment of the present invention, authoring tool 101 may utilize predefined relationship data 106 (of FIG. 1) to determine a desired relationship to maintain between columns 303 and 304, and responsive to the changed width attribute of first column 303, authoring tool 101 autonomously generates (via code generation logic 105 of FIG. 1) CSS code defining one or more attributes of second column 304 to maintain the desired relationship (e.g., to avoid the overlapping situation encountered in FIG. 3B).

For instance, as shown in FIG. 3C, according to an embodiment of the present invention authoring tool 101 may utilize predefined relationship data 106 (of FIG. 1) to determine a relationship that is desired to be maintained between columns 303 and 304, and responsive to the changed width attribute of first column 303 (in FIG. 3B), authoring tool 101 autonomously generates (via code generation logic 105 of FIG. 1) CSS code defining one or more attributes of second column 304 to maintain the desired relationship (e.g., to avoid the overlapping situation encountered in FIG. 3B). Such exemplary CSS code defining (e.g., modifying) attributes of the second column 304 to maintain the desired relationship is shown in code view 301 of FIG. 3C. In this example, the "margin" property under the selector "#mainContent" has been edited to properly position the second column (main content column) 304 to maintain the desired relationship between the columns 303 and 304.

According to certain embodiments of the present invention, authoring tool 101 provides a user interface 102 that enables a developer to directly define certain attributes of a display element, and responsive to input received by user interface 102 that directly defines an attribute of a display element, authoring tool 101 generates style sheet language code that indirectly defines the attribute in a manner that reflects the received direct definition of the attribute. For example, user interface 102 may enable a user (e.g., developer) to directly define such attributes as width, height, and position of a column display element and/or space between two column display elements, which are indirectly defined in the style sheet language code, and the authoring tool 101 generates the corresponding style sheet language code to indirectly define such attributes of the column to reflect the directly defined attributes. For instance, in response to the user directly defining the desired column spacing that is indirectly defined in the style sheet language code, the authoring tool may generate style sheet language code that specifies the desired location of the column edges (e.g., relative to the edge of the column's container) that results in the columns having the spacing therebetween as defined by the user.

Figure 4A:
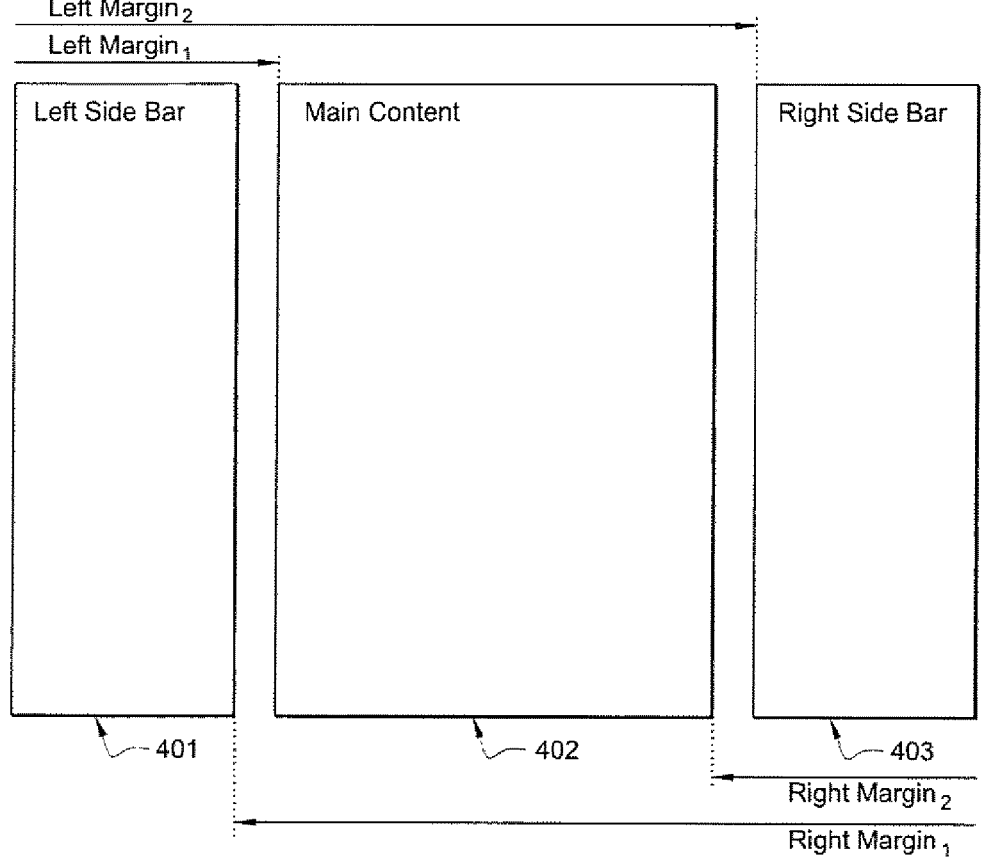
FIG. 4A shows an illustrative example of indirectly defining a spacing attribute of display elements.
Figure 4B:
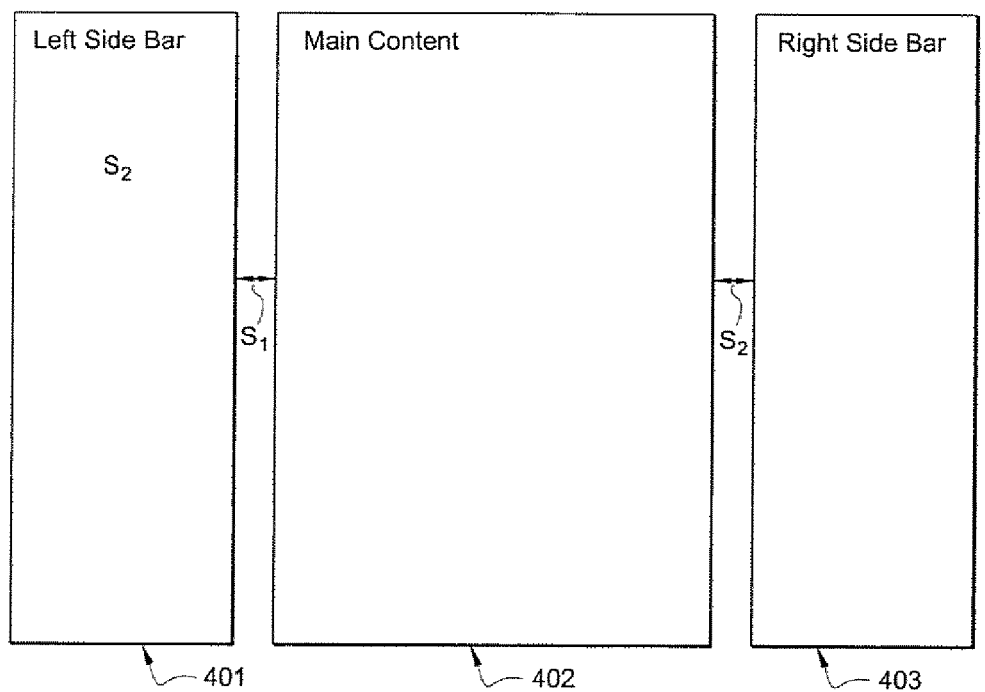
FIG. 4B shows an illustrative example of directly defining a spacing attribute of display elements that is indirectly defined in style sheet language code.

FIG. 4A shows an illustrative example of indirectly defining a spacing attribute of display elements, while FIG. 4B shows an illustrative example of directly defining a spacing attribute of display elements. Turning first to FIG. 4A, in this example, a 3-column layout is defined, with a left sidebar 401, a right sidebar 403, and a main content column 402 in the center, which is centered between the left and right sidebars with a small amount of space between the main content column 402 and each of the left and right sidebars. The spacing between the center column 402 and the left and right sidebars may not be directly specified in the CSS code, but rather is indirectly defined therein based on the respective left and right margins defined for the columns (as shown in FIG. 4A). For instance, a first right margin "Right Margin$_1$", defines the right edge of the left sidebar 401 relative to the right edge of sidebar 401's container or "parent" (which is the overall page in this example), and a first left margin, "Left Margin$_1$", defines the left edge of the main content column 402 relative to the left edge of the page. Thus, the spacing between the left sidebar 401 and the main content column 402 is defined by the positions of the right edge of left sidebar 401 and the left edge of main content column 402, which are in turn defined by Right Margin$_1$ and Left Margin$_1$, respectively. Similarly, a second right margin "Right Margin$_2$", defines the right edge of the main content column 402, and a second left margin, "Left Margin$_2$", defines the left edge of the right sidebar 403. Thus, the spacing between the right sidebar 403 and the main content column 402 is defined by the positions of the right edge of main content column 402 and the left edge of right sidebar 403, which are in turn defined by Right Margin$_2$ and Left Margin$_2$, respectively. Accordingly, the amount of spacing between main content column 402 and left sidebar 401 and right sidebar 403 is indirectly defined in the CSS code relative to the left and right edges of their containers (e.g., the page on which they reside in this example).

On the other hand, in certain embodiments of the present invention, authoring tool 101 aids a developer in directly defining attributes of a display element that may be indirectly defined in the CSS code, wherein the authoring tool 101 is operable to generate corresponding CSS code for indirectly defining attributes of the display element in order to reflect the received direct definition thereof. FIG. 4B illustrates an example in which display elements 401, 402, and 403 are again presented, and as mentioned above with FIG. 4A the spacing between the center column 402 and the left and right sidebar columns 401, 403 may be indirectly defined in the CSS code. However, as indicated in FIG. 4B, authoring tool 101 may enable a user to directly define the spacing between the columns directly, wherein the authoring tool 101 may generate the corresponding CSS code to indirectly define the spacing between the columns therein (e.g., by defining the left and right margins in the CSS code for effectively specifying where the left and right edges of the columns are to be located in the manner illustrated in FIG. 4A). For instance, the spacing $S_1$ between left sidebar 401 and main content column 402 may be directly defined by a user in certain embodiments of the present invention, and similarly the spacing $S_2$ between main content column 402 and right sidebar 403 may be directly defined by a user in certain embodiments of the present invention. Accordingly, in certain embodiments, a user may directly define (e.g., modify) the amount of space between the display elements (e.g., columns), wherein the authoring tool 101 generates the appropriate CSS code to indirectly define such space to achieve the desired result of the direct definition provided by the user.

Any one or more of various types of user interfaces 102 may be provided by authoring tool 101 to enable a user 100 to directly define attributes of a display element. As one example, in a display view, such as display view 109 of FIG. 1 or display view 302 of FIGS. 3A-3C, a user may interact with a displayed display element to define a desired attribute. For instance, a user may click (e.g., with a pointer device, such as a mouse) and drag an edge of a display element to re-size the display element to a desired size, thereby directly defining a size attribute (e.g., width, height, etc.) of the display element. In certain embodiments, a user may select display element (e.g., by double-clicking with a pointer device, such as a mouse) that is presented in a display view, and a user interface, such as a pop-up window, may be presented that enables the user to input desired attributes for the selected display element. For instance, in response to selecting a column display element presented in the display view, a user interface may be presented that shows the current values for various attributes of the column (such as width, height, position, etc.), wherein a user may interact with the user interface to modify any of the various attribute values, thereby directly defining such attributes of the column display element.

As another example, in certain embodiments, a user may select (e.g., highlight with a pointing device, such as a mouse) text in the code view that defines a display element, and in response to such selection of the text the authoring tool 101 may present a user interface 102 to enable direct editing of attributes of such selected display element.

Figure 5:
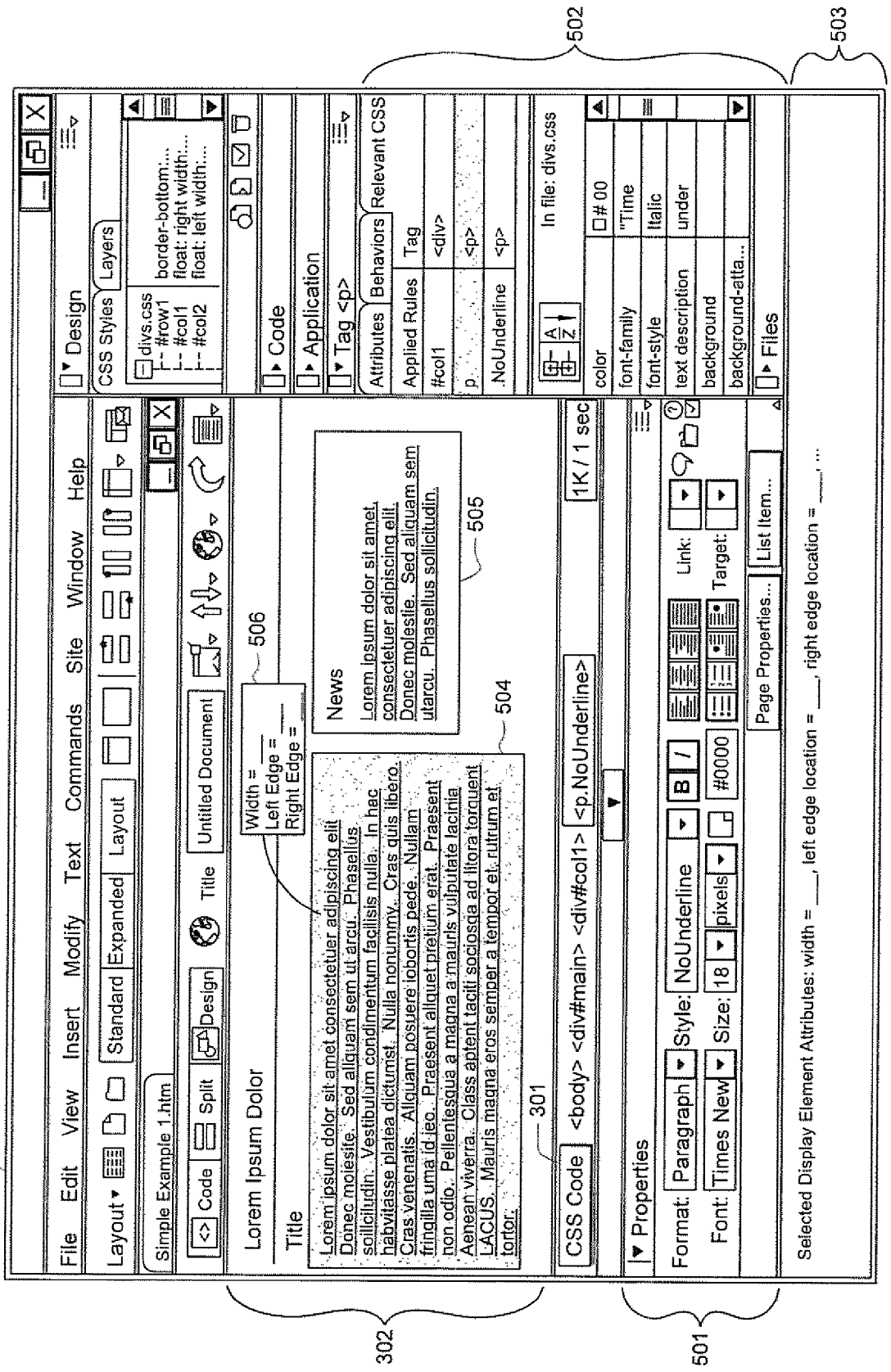
FIG. 5 shows an exemplary user interface that may be presented by authoring tool according to one embodiment of the present invention.

As still another example, a toolbar may be presented by authoring tool 101 that provides a user interface 102 to enable a user to directly define attributes of a selected display element. For instance, FIG. 5 shows an exemplary user interface 102 that may be presented by authoring tool 101 according to one embodiment of the present invention. The exemplary user interface 102 of FIG. 5 comprises a display view 302 and a code view 301, wherein a user may selectively choose to have the authoring tool present either of such display view 302 and code view 301 or may select to have both views displayed (as shown in FIG. 5). Exemplary user interface 102 also presents a property inspector 501 that allows a developer to manipulate certain attributes of various elements and content of a web page document, such as attributes of elements defined in HTML code and/or attributes defined in CSS code. Property inspector 501 includes an interface for defining such attributes as font (including font type, size, and color), bolding, italicizing, and the like, which enable a developer to define (e.g., change) individual properties or appearances of web content (e.g., of a markup language document).

Also included in user interface 102 of FIG. 5, is a CSS inspector 502. CSS inspector 502 provides a "styles panel" which displays all of the CSS rules that apply to the document, or all of the rules that are relevant to the current selection (in design view or code view). CSS inspector 502 can also be used to change the property values of existing rules, add new rules, and add new CSS declarations to existing rules (a declaration is basically what sets a property, such as "width", to a particular value, such as "200px" or 200 pixels). The above-mentioned exemplary user interface elements included in user interface 102 of FIG. 5 are available in known application development tools, such as DREAMWEAVER, and are further described in co-pending and commonly assigned U.S. patent application Ser. No. 10/930,714 titled "AUTOMATIC CREATION OF CASCADING STYLE SHEETS", the disclosure of which is hereby incorporated herein by reference.

Additionally, in this example, a CSS display element attributes inspector toolbar 503 is included in user interface 102. A user may interact with such toolbar 503 to directly define various attributes of a selected display element. In this example, in response to a user selecting display element 504, the corresponding attributes of that display element, such as width, left edge location, right edge location, etc., may be presented in toolbar 503, whereby a user may interact directly with toolbar 503 to modify those attributes, if so desired. While exemplary attributes of width, left edge location, and right edge location are shown in toolbar 503 in the illustrated example, any attributes in addition to or instead of those attributes may be likewise presented in other embodiments, and in certain embodiments, the types of attributes presented may vary depending on the corresponding type of display element selected. In response to a user directly defining (e.g., modifying) attributes of a display element via toolbar 503, authoring tool 101 autonomously updates the CSS code (shown in code view 301) to reflect such defined attributes. As described further herein, in certain embodiments, authoring tool 101 may generate CSS code that indirectly defines such attributes to reflect the directly defined attributes desired by the user.

Further, in this exemplary embodiment, a user may select a display element shown in display view 302 and directly define certain attributes of the selected display element. For instance, in this example display elements 504 and 505 are shown in display view 302. In response to a user double-clicking display element 504, a user interface (e.g., pop-up window) 506 may be presented that enables a user to input information directly defining certain attributes of display element 504. In this example, exemplary pop-up window 506 presents various attributes of the selected display element 504, such as width, left edge location, right edge location, etc., whereby a user may interact directly with pop-up window 506 to modify those attributes, if so desired. While exemplary attributes of width, left edge location, and right edge location are shown in pop-up window 506 in the illustrated example, any attributes in addition to or instead of those attributes may be likewise presented in other embodiments, and in certain embodiments, the types of attributes presented may vary depending on the corresponding type of display element selected. In response to a user directly defining attributes of display element 504 via interface 506, authoring tool 101 autonomously updates the CSS code (shown in code view 301) to reflect such defined attributes. As described further herein, in certain embodiments, authoring tool 101 may generate CSS code that indirectly defines such attributes to reflect the directly defined attributes desired by the user.

Figure 6:
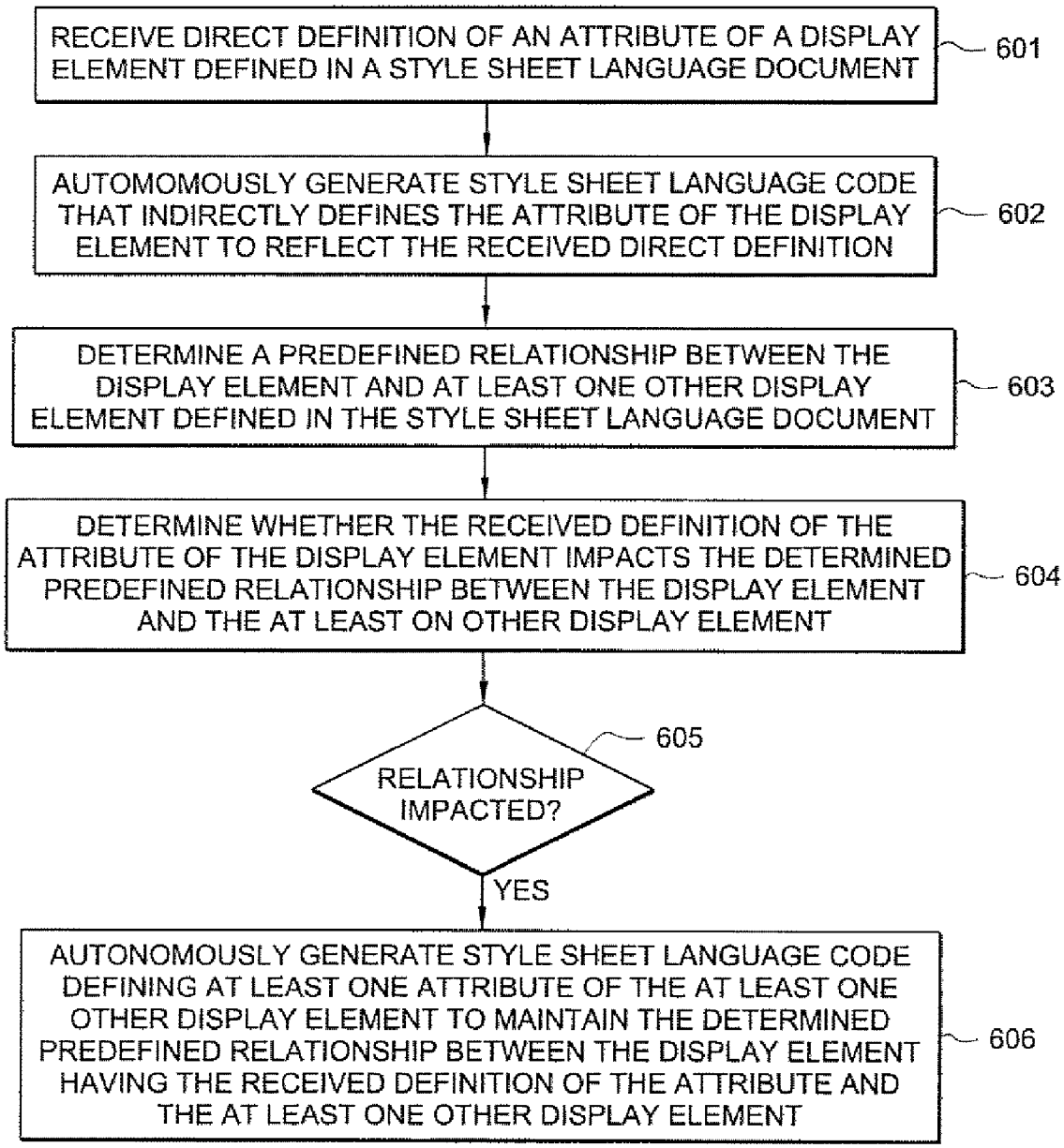
FIG. 6 shows another exemplary operational flow diagram for an authoring tool according to one embodiment of the present invention.

FIG. 6 shows an operational flow diagram of authoring tool 101 according to one embodiment of the present invention. In operational block 601, authoring tool 101 receives, via user interface 102, a direct definition of an attribute of a display element that is indirectly defined in the style sheet language code (e.g., width of display element 402 of FIG. 4A described above). In operational block 602, authoring tool 101 autonomously generates (e.g., via code generation logic 105 of FIG. 1) style sheet language code that indirectly defines the attribute of the display element to reflect the received direct definition. For instance, in the example of FIGS. 4A-4B above, in response to a user directly defining the width desired for the main content column 402, the authoring tool 101 autonomously generates code to indirectly define such width by, for example, defining the positions of the left and right edges of the main content column 402 by defining the left and right margins (as illustrated in FIG. 4A).

Of course, if a desired relationship is desired to be maintained between the main content column 402 and the side bar columns 401 and 403, the authoring tool 101 may determine such relationship and may alter the attributes of such side bar columns 401 and 403 also in the CSS code in order to maintain such relationship responsive to the modified width of main content column 402. Thus, in operational block 603, authoring tool 101 determines (via relationship determining logic 104) a predefined relationship between the display element (e.g., display element 402 of FIGS. 4A-4B) and at least one other display element (e.g., display elements 401 and 403 of FIGS. 4A-4B) defined in the style sheet language document. As described further herein, such relationship may be predefined in relationship data 106 associated with the style sheet language document, which is readable by authoring tool 101.

In operational block 604, authoring tool 101 determines whether the received definition of the attribute of the display element 110 impacts the determined predefined relationship between the display element 402 and the at one other display element 401, 403. For instance, as illustrated in FIGS. 4A-4B, display element 402 and display elements 401 and 403 may be columns, and relationship data 106 may specify that the columns are to be arranged side-by-side immediately adjacent each other in the manner shown in FIGS. 4A-4B. A received definition for certain attributes of column 402 may impact the defined side-by-side relationship with columns 401 and/or 403. For instance, a received definition for the width of the column 402 may impact the side-by-side relationship with columns 401 and/or 403 (e.g., an increase in the width of the column 402 may cause such column 402 to overlap with column 401 and/or column 403 if attributes of columns 401 and/or 403 are not modified).

When determined, in operational block 605, that the received definition of the attribute of the display element 402 impacts the determined predefined relationship between the display element 402 and the at least one other display element 401, 403, authoring tool 101 autonomously generates (via code generation logic 105), in operational block 606, style sheet language code defining at least one attribute of the at least one other display element 401, 403 to maintain the determined predefined relationship between the display element 402 having the received definition of the attribute and the at least one other display element 401, 403. Thus, continuing with the above example, when determined that the received definition for the width of the column 402 impacts the predefined side-by-side relationship with columns 401 and 403, authoring tool 101 autonomously generates code within the style sheet language code defining at least one attribute of the column 401 and/or 403 to maintain the side-by-side relationship (rather than having column 402 overlap column 401 and/or 403).

Figure 7:
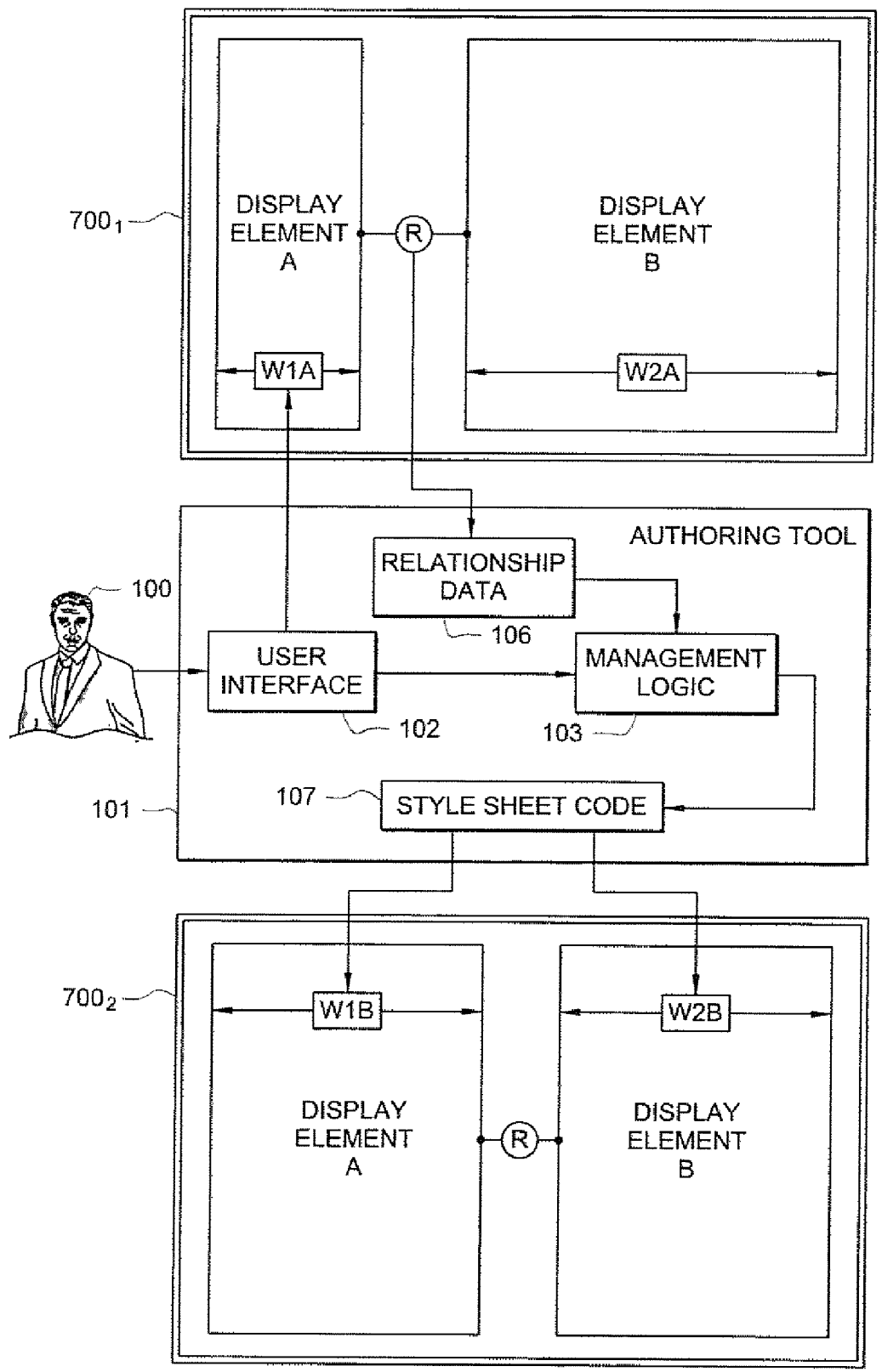
FIG. 7 shows an exemplary scenario in which a user interacts with a user interface of an authoring tool of one embodiment of the present invention to define an attribute of a display element, and the authoring tool autonomously generates style sheet code to define attributes of another display element in order to maintain a predefined relationship between the display elements.

FIG. 7 shows an exemplary scenario in which a user 100 interacts with a user interface 102 of authoring tool 101 to define an attribute of a display element, and authoring tool 101 autonomously generates style sheet code to define attributes of another display element in order to maintain a predefined relationship between the display elements. In this example, authoring tool 101 first presents a display view $700_1$ that shows display elements 701 and 702 defined by style sheet language code 107. In this example, display element 701 has a width of W1A, and display element 702 has a width of W2A. A predefined relationship between display elements 701 and 702, shown as relationship "R" in display view $700_1$, is defined in relationship data 106 associated with style sheet language code 106. As described further below with FIG. 8, such relationship may be a static or dynamic relationship.

In this example, user 100 desires to widen display element 701. User 100 interacts with a user interface 102 (such as any of the exemplary interfaces described above) to define a new width W1B for display element 701. As described further herein, style sheet language code 107 is updated to define the new width attribute, W1B, of display element 701. Additionally, attribute management logic 103 further autonomously generates style sheet language code to define (e.g., modify) one or more attributes of display element 702 in order to maintain the predefined relationship "R" between display elements 701 and 702. As a result, a new display view $700_2$ is presented that reflects the updated attributes of display elements 701 and 702.

Figure 8:
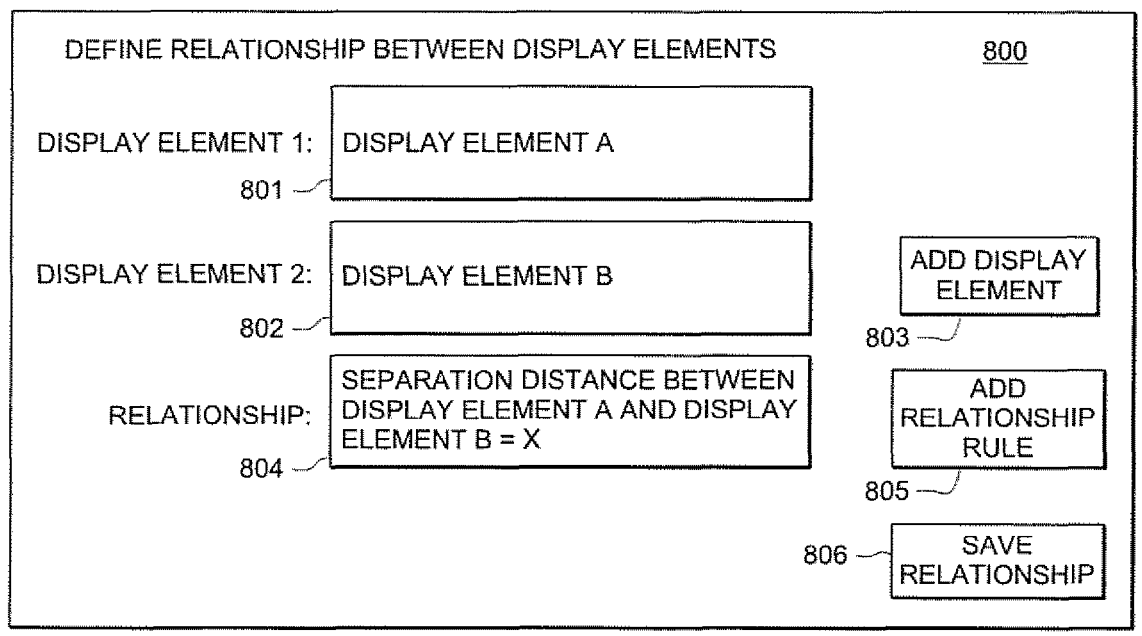
FIG. 8 shows an exemplary user interface of the authoring tool according to one embodiment of the present invention which enables a user to define a desired relationship to maintain between display elements.

In certain embodiments, authoring tool 101 provides a user interface that enables a user (e.g., developer) to define a desired relationship (e.g., relationship "R" of FIG. 7) between a plurality of display elements of a style sheet language code. FIG. 8 shows an exemplary interface 800 in which a user can define such a desired relationship. As shown in this exemplary user interface 800, an input box 801 is provided to enable a user to specify a first display element, and an input box 802 is provided to enable a user to specify a second display element. In the illustrated example, the user has specified Display Element A and Display Element B, such as those shown in FIG. 7, in boxes 801 and 802, respectively. Further, a button 803 is provided that when activated by the user enables the user to specify a further display element. Thus, in response to activating button 803, an additional display element box (such as boxes 801 and 802) may be presented to enable a user to identify a third display element box. In this regard, a relationship may be defined between two or more display elements of a page.

Additionally, exemplary user interface 800 includes a user interface input box 804 that enables a user to define a relationship between the identified display elements of boxes 801 and 802. In the illustrated example, the user has defined a separation distance between Display Element A and Display Element B as being equal to "X". As discussed further herein, such distance "X" may be a static value or it may be defined as a variable value. Further, a button 805 is provided that when activated by the user enables the user to add an additional relationship rule. Thus, in response to activating button 805, an additional rule definition input box (such as box 804) may be presented to enable a user to identify an additional relationship rule for the identified display elements. In this regard, one or more relationship rules may be defined for two or more display elements of a page. In certain embodiments, certain commonly-used rules may be predefined and available for selection by a user (e.g., via a drop-down list from input box 804, etc.). As an example, a predefined rule for "maintaining display elements immediately adjacent each other" may be available for selection by a user. Once the relationship rule(s) are defined, the user can activate the save relationship rules button 806 to save the rules, which may be associated (e.g., as metadata, etc.) with the corresponding page for which the rules are defined.

A relationship that a user defines (e.g., via exemplary user interface 800 of FIG. 8) or that is predefined for a template may define either a static or a dynamic relationship between display elements. For instance, with reference to FIG. 7, "R" may be a static relationship that specifies a fixed separation distance to be maintained between display elements 701 and 702. As another example, "R" may be a dynamic relationship that specifies that the separation distance to be maintained between display elements 701 and 702 is to be a function of, for instance, the width of one or more of the display elements (and/or some other attribute of the display elements).

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 9:
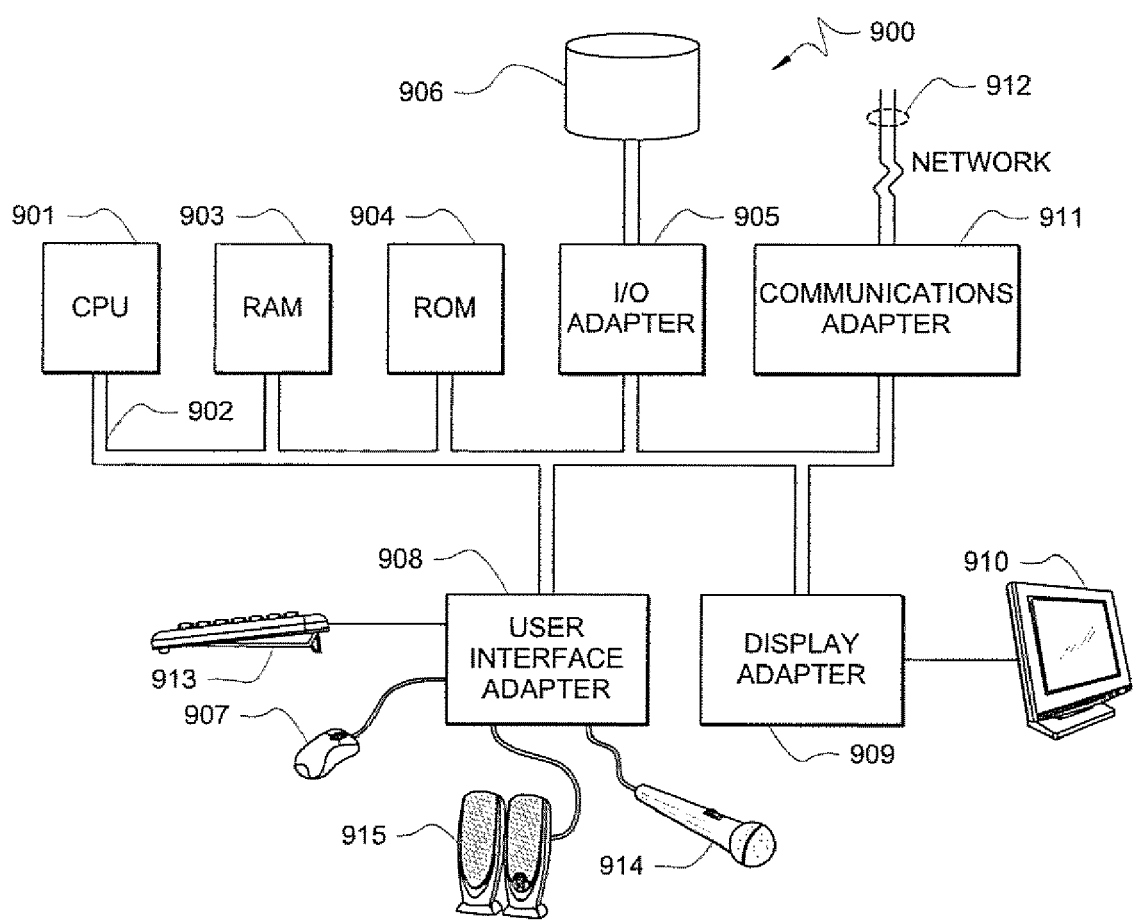
FIG. 9 shows an exemplary system on which an authoring tool may be implemented according to one embodiment of the present invention.

FIG. 9 illustrates an exemplary computer system 900 on authoring tool 101 may be implemented according to one embodiment of the present invention. Central processing unit (CPU) 901 is coupled to system bus 902. CPU 901 may be any general-purpose CPU. The present invention is not restricted by the architecture of CPU 901 (or other components of exemplary system 900) as long as CPU 901 (and other components of system 900) supports the inventive operations as described herein. CPU 901 may execute the various logical instructions according to embodiments of the present invention. For example, CPU 901 may execute machine-level instructions according to the exemplary operational flows described above in conjunction with FIGS. 2 and 6.

Computer system 900 also preferably includes random access memory (RAM) 903, which may be SRAM, DRAM, SDRAM, or the like. Computer system 900 preferably includes read-only memory (ROM) 904 which may be PROM, EPROM, EEPROM, or the like. RAM 903 and ROM 904 hold user and system data and programs, as is well known in the art.

Computer system 900 also preferably includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information, such as interacting with a user interface to define desired display element attributes, as described above.

I/O adapter 905 preferably connects to storage device(s) 906, such as one or more of hard drive, compact disc (CD) drive, floppy disk drive, tape drive, etc. to computer system 900. The storage devices may be utilized when RAM 903 is insufficient for the memory requirements associated with storing data for operations of the authoring tool 101. Communications adapter 911 is preferably adapted to couple computer system 900 to network 912, which may enable information to be input to and/or output from system 900 via such network 912 (e.g., the Internet or other wide-area network, a local-area network, a public or private switched telephony network, a wireless network, any combination of the foregoing). User interface adapter 908 couples user input devices, such as keyboard 913, pointing device 907, and microphone 914 and/or output devices, such as speaker(s) 915 to computer system 900. Display adapter 909 is driven by CPU 901 to control the display on display device 910 to, for example, display information pertaining to an application under development, such as code view 301 and graphical-based design-time (or "display") view 302, according to certain embodiments of the present invention.

It shall be appreciated that the present invention is not limited to the architecture of system 900. For example, any suitable processor-based device may be utilized for implementing authoring tool 101, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-transitory computer-readable medium comprising program code to be executed by a processor, the program code comprising:
   program code for receiving a first display element, the first display element defined at least in part according to a first style attribute defined in a style sheet language;
   program code for receiving a second display element, the second display element defined at least in part according to a second style attribute defined in the style sheet language;
   program code for receiving a first relationship between the first display element and the second display element;
   program code for automatically generating a modified second style attribute in the style sheet language, the modified second style sheet attribute based on the first style attribute and the first relationship;
   program code for storing the modified second style attribute in the style sheet language document;
   program code for receiving a third display element, the third display element defined at least in part according to a third style attribute defined in a style sheet language;
   program code for receiving a second relationship between the first display element and the third display element;

program code for automatically generating a modified third style attribute in the style sheet language, the modified third style sheet attribute based on the first style attribute and the second; and program code for storing the modified third style attribute in the style sheet language document, wherein at least one of the first or the second relationship comprises a spatial relationship or a size relationship, and wherein at least one of the first or the second relationship is dynamic.

2. The non-transitory computer-readable medium of claim 1, further comprising:

program code for receiving a modification of the first style attribute; and program code for storing the modification of the first style attribute in the style sheet language document;

wherein the modified second style sheet attribute is further based on the modification of the first style attribute.

3. The non-transitory computer-readable medium of claim 1, wherein the style sheet language document comprises a Cascading Style Sheet (CSS) document.

4. The non-transitory computer-readable medium of claim 1, further comprising program code for storing the relationship in the style sheet language document.

5. The non-transitory computer-readable medium of claim 1, wherein the program code for receiving a relationship between the first display element and a second display element comprises program code for receiving the relationship from a style sheet language document.

6. The non-transitory computer-readable medium of claim 1, wherein the relationship is static.

7. A computer-implemented method comprising:

receiving a first display element, the first display element defined at least in part according to a first style attribute defined in a style sheet language;

receiving a second display element, the second display element defined at least in part according to a second style attribute defined in the style sheet language;

receiving a first relationship between the first display element and the second display element;

automatically generating a modified second style attribute in the style sheet language, the modified second style sheet attribute based on the first style attribute and the first relationship;

storing the modified second style attribute in the style sheet language document;

receiving a third display element, the third display element defined at least in part according to a third style attribute defined in a style sheet language;

receiving a second relationship between the first display element and the third display element;

automatically generating a modified third style attribute in the style sheet language, the modified third style sheet attribute based on the first style attribute and the second relationship; and storing the modified third style attribute in the style sheet language document, wherein at least one of the first or the second relationship comprises a spatial relationship or a size relationship, and wherein at least one of the first or the second relationship is dynamic.

8. The method of claim 7, further comprising:

receiving a modification of the first style attribute; and storing the modification of the first style attribute in the style sheet language document;

wherein the modified second style sheet attribute is further based on the modification of the first style attribute.

9. The method of claim 7, wherein the style sheet language document comprises a Cascading Style Sheet (CSS) document.

10. The method of claim 7, further comprising storing the relationship in the style sheet language document.

11. The method of claim 7, wherein receiving a relationship between the first display element and a second display element comprises receiving the relationship from a style sheet language document.

12. The method of claim 7, wherein the relationship is static.

13. A system, comprising:

a memory;

a processor in communication with the memory, the processor configured to:

receive a first display element, the first display element defined at least in part according to a first style attribute defined in a style sheet language;

receive a second display element, the second display element defined at least in part according to a second style attribute defined in the style sheet language;

receive a first relationship between the first display element and the second display element;

automatically generate a modified second style attribute in the style sheet language, the modified second style sheet attribute based on the first style attribute and the first relationship;

store the modified second style attribute in the style sheet language document;

receive a third display element, the third display element defined at least in part according to a third style attribute defined in a style sheet language;

receive a second relationship between the first display element and the third display element;

automatically generate a modified third style attribute in the style sheet language, the modified third style sheet attribute based on the first style attribute and the second relationship; and store the modified third style attribute in the style sheet language document, wherein at least one of the first or the second relationship comprises a spatial relationship or a size relationship, and wherein at least one of the first or the second relationship is dynamic.

14. The system of claim 13, wherein the processor is further configured to:

receive a modification of the first style attribute; and store the modification of the first style attribute in the style sheet language document;

wherein the modified second style sheet attribute is further based on the modification of the first style attribute.

15. The system of claim 13, wherein the style sheet language document comprises a Cascading Style Sheet (CSS) document.

16. The system of claim 13, wherein the processor is further configured to store the relationship in the style sheet language document.

17. The system of claim 13, wherein the processor is further configured to receive the relationship from a style sheet language document.

18. The system of claim 13, wherein the relationship is static.

* * * * *